United States Patent
Martindale et al.

(10) Patent No.: US 6,694,123 B2
(45) Date of Patent: Feb. 17, 2004

(54) TALKING BOOK METHOD AND SYSTEM

(75) Inventors: Geoffrey Martindale, Richardson, TX (US); Suman Narayan, Richardson, TX (US)

(73) Assignee: Texas Instruments Incorporated, Dallas, TX (US)

(*) Notice: Subject to any disclaimer, the term of this patent is extended or adjusted under 35 U.S.C. 154(b) by 204 days.

(21) Appl. No.: 09/732,278

(22) Filed: Dec. 7, 2000

(65) Prior Publication Data

US 2002/0042040 A1 Apr. 11, 2002

Related U.S. Application Data

(60) Provisional application No. 60/169,308, filed on Dec. 7, 1999.

(51) Int. Cl.[7] .............................................. G09B 11/00
(52) U.S. Cl. ....................................... 434/317; 434/365
(58) Field of Search .......................... 434/167, 48, 362, 434/307 R, 185, 317, 311, 365, 169

(56) References Cited

U.S. PATENT DOCUMENTS

| | | | | |
|---|---|---|---|---|
| 3,641,684 A | * | 2/1972 | Paige | 206/232 |
| 4,884,974 A | * | 12/1989 | DeSmet | 281/15.1 |
| 4,990,092 A | * | 2/1991 | Cummings | 40/455 |
| 5,368,488 A | * | 11/1994 | Gentile | 434/317 |
| 5,413,486 A | * | 5/1995 | Burrows et al. | 434/308 |
| 5,466,158 A | * | 11/1995 | Smith, III | 273/236 |
| 5,474,457 A | * | 12/1995 | Bromley | 434/308 |
| 5,511,980 A | * | 4/1996 | Wood | 434/157 |
| 5,631,883 A | * | 5/1997 | Li | 369/64 |
| 5,749,735 A | * | 5/1998 | Redford et al. | 340/825.72 |
| 5,795,156 A | * | 8/1998 | Redford et al. | 434/118 |
| 5,839,905 A | * | 11/1998 | Redford et al. | 340/825.72 |
| 6,091,930 A | * | 7/2000 | Mortimer et al. | 434/118 |

OTHER PUBLICATIONS

"Analysis and Design of Digital Integrated Circuits", second edition, David A. Hodges and Horace G. Jackson, copyright 1988 McGraw-Hill pp. 342–376.*

* cited by examiner

*Primary Examiner*—Teresa Walberg
*Assistant Examiner*—Kathleen M Christman
(74) *Attorney, Agent, or Firm*—W. James Brady, III; Frederick J. Telecky, Jr.

(57) ABSTRACT

A talking book and a method of authoring a talking book is presented where the talking book includes a synthesizer, an audio system, a memory, a display, and switches for selecting pages and/or chapters of the talking book. The talking book is authored by a script that lists speech files, the sampling rate, and the chapter and page boundaries. Configuration tables and segment tables are generated from the script and these tables are assembled with a playback program to combined binary data stored in the talking book.

5 Claims, 1 Drawing Sheet

TALKING BOOK METHOD AND SYSTEM

This application claims priority under 35 USC §119(e)(1) of provisnnal application No. 60/169,308, filed Dec. 7, 1999.

Appendixes A through F recited herein are found in a Computer Programming Listing Appendix on a compact disc. Appendixes A through F are incorporated herein by reference to the compact disc. These appendixes were created for the application on Aug. 14, 2003. Appendix A is 5 KB, Appendix B is 30 KB, Appendix C is 30 KB, Appendix D is 5 KB, Appendix E is 14 KB and Appendix F is 30 KB. The appendixes are ASCII format documents on IBM-PC machine. Microsoft Word XP was used to create the files.

COPYRIGHT AUTHORIZATION

A portion of the disclosure of this patent document contains material which is subject to copyright protection. The owner, Texas Instruments, Inc., has no objection to the facsimile reproduction by any one of the patent disclosure, as it appears in the Patent and Trademark Office patent files or records of any country, but reserves all rights whatsoever.

FIELD OF INVENTION

This invention relates to a talking book system and more particularly to a method of authoring a talking book with a speech and sound synthesizer.

BACKGROUND OF INVENTION

A talking book is a system whereby speech and sound data is stored on a memory device (integrated circuit, for example) and arranged in such a way that each unit of the data may be played back through a synthesizer. It is highly desirable to make this book more like a regular book containing chapters, pages, etc., and as such, organizing the data so this is possible.

SUMMARY OF INVENTION

In accordance with one embodiment of the present invention, the system comprises a speech synthesizer, a memory, and audio circuitry for producing the audio from the synthesizer. The synthesizer and the memory are organized to selectively provide book sections such as chapters and pages. The synthesizer includes control switches for selecting book sections.

In accordance with another embodiment, a method is provided for authoring a talking book.

DESCRIPTION OF PREFERRED EMBODIMENT OF THE PRESENT INVENTION

Figure 1:
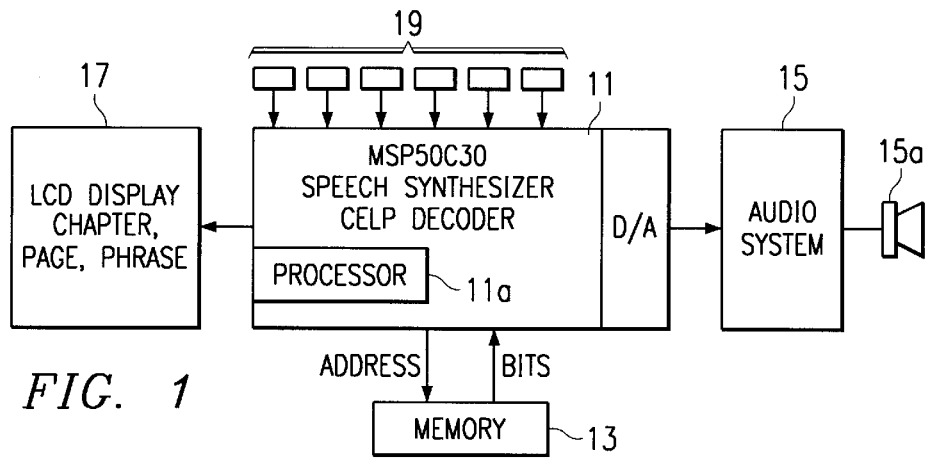
FIG. 1 is a block diagram of the talking book system according to one embodiment of the present invention.
Figure 2:
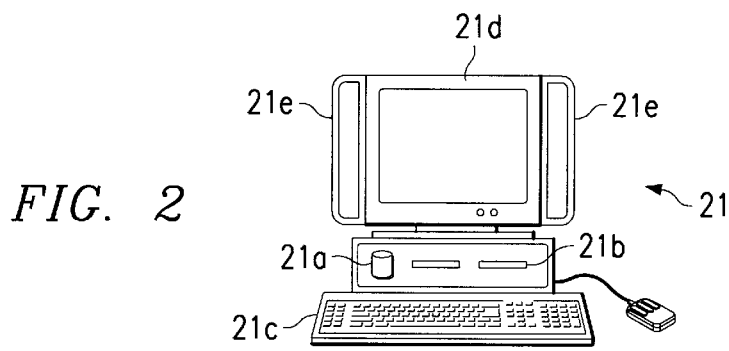
FIG. 2 is a block diagram of the system for authoring a talking book.

Referring to FIG. 1, there is illustrated a block diagram of a talking book according to one embodiment of the present invention. The system 10 includes a speech synthesizer 11 such as Texas Instruments, Inc. MSP5OC30, memory 13 such as 8 MBit Flash memory, an audio system 15 with speaker 15a and a display such as Liquid Crystal Display (LCD) 17 and switches 19 coupled to the synthesizer 11. The synthesizer contains a processor that runs a program, addresses the memory 13, synthesizes the bits using, for example, a CELP decoder in the synthesizer and generates analog signals which are sent to the audio system including a receiver with an amplifier to drive the speaker 15a. The term "talking book" herein refers to a speech synthesizer device that has speech and sounds that play out a story or group of stories that are arranged in chapters, pages and phrases so that any chapter, page or phrase may be accessed easily and quickly in much the same way as a traditional paper book can be opened at any page. To enable this, the system further includes a display 17 that will display chapter, pages and phrases. The talking book may be merged with a paper book page that corresponds with the speech or sound. The system further includes the set of push button switches 19 for repeat, skip forward, skip back, page forward, page back, chapter forward, chapter back. These switches cause the processor to generate the corresponding addresses to be sent to the memory 13 to cause memory to send the addressed bits for the synthesizer 11 to synthesize the addressed bits and send the output to the audio system 15 and to send the chapter, page number and phrase number to the display 17 using the processor 11a and the control program in the processor 11 and the information stored in memory 13.

In accordance with an embodiment of the present invention is the method of authoring such a talking book where the input is a script listing the speech content of the talking book. A talking book contains large amounts (megabytes) of data. A problem arises in defining the content of each chapter, page or phrase may be accessed easily and quickly in the manner of the traditional paper book. The method for creating such a talking book is performed on a workstation 21 such as a personal computer with memory 21a, disc and/or CD storage 21b, a keyboard 21c, a display 21d, a speaker and sound card 26e and I/O terminal and bus. The output is stored on a memory such as a hard drive storage 21b. This is copied into the memory 13 of FIG. 1.

Figure 3:
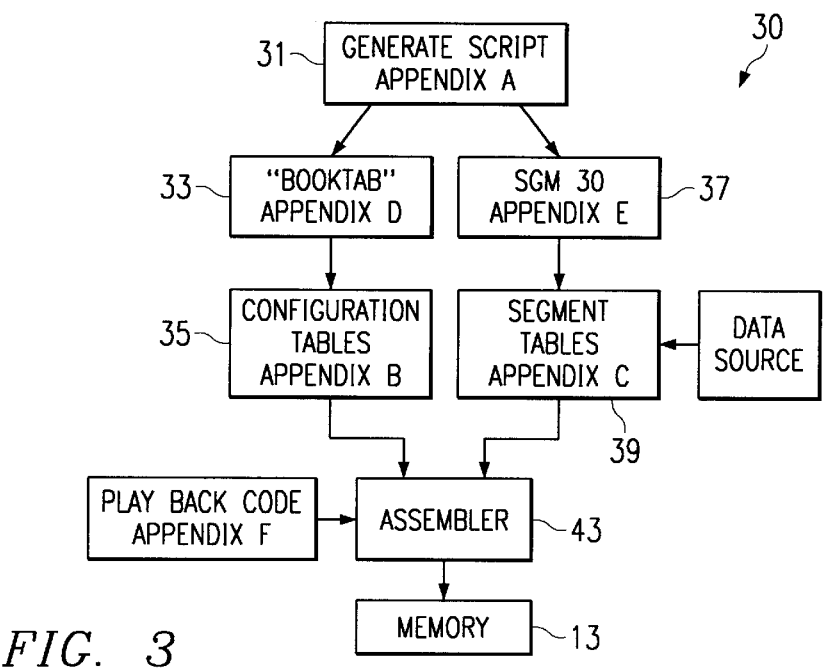
FIG. 3 illustrates the method for authoring the talking book.

Referring to FIG. 3, there is illustrated the method 30 whereby a talking books is authored. A script 31 written by the author is processed by a program called "BOOKTAB" (Appendix D) 33 to generate configuration tables 35 (Appendix B) and by a program called SGM 30 (37 in FIG. 3) (Appendix E) to generate data segment tables 39 (Appendix C). The SGM 30 program copies and registers the location of the sound data at source 41 to the selected segments of the memory. Only the script is of concern to the author. It is not necessary that the author understand the details of the "BOOKTAB" or SGM 30 programs or the control software. Phrases and sounds are listed in place of written sentences and paragraphs. The configuration tables 35 from "BOOKTAB" program 33 and the segment tables 39 from SGM 3037 are provided with the playback code 45 (Appendix F) to assembler/compiler 43 to be combined together and to generate the machine object code for storage on the hard drive storage 21b according to playback code 45 (Appendix F) for both storage on the hard drive 21b and then copied to and accessed from the memory 13. The workstation has the same control program or playback code 45 as in the processor 13a of speech synthesizer 11.

The first stage in creating a Talking book is to write a script. This is simply a list of speech files interspersed with a number of keywords or commands. Any line which begins with a '*' character may either be a comment or a command. Currently, there are four keywords which have the following function:

| | |
|---|---|
| CHAPTER | Start a new chapter |
| PAGE | Start a new page |
| 10K | Switch to a sampling rate of 10 kHz |
| 8K | Switch to a sampling rate of 8 kHz |

Part of a script is shown below (the full script is in Appendix A). From this it can be deduced that chapter 1, page 1 begins with an Indian flute—'speech\sinbad\flut10a.BYT'—at a sampling rate of 10 kHz. The next command switches the sampling rate back to 8 kHz. The second phrase of the first page is 'speech\sinbad\V1_01.BYT'.

The second page begins with 'speech\sinbad\V1_05.BYT'. This is the first phrase of page two, but the sixth phrase of the book.

```
*Script for Sinbad's Voyages
*Toy Fair 1999
*
*Keywords: CHAPTER, PAGE,
    10K, 8K
*Filenames should be in 8.3 format
*Scene setter: Indian flute
*10K
speech\sinbad\flut10a.BYT      ; first phrase of chapter 1, page 1
*8K
speech\sinbad\V1_01.BYT
speech\sinbad\V1_02.BYT
speech\sinbad\V1_03.BYT
speech\sinbad\V1_04.BYT
*PAGE
speech\sinbad\V1_05.BYT        ;first phrase of chapter 1, page 2
speech\sinbad\V1_06.BYT
```

In this way, the script for a talking book can be created, with files and commands added or modified as necessary.

In order for the script to become part of the talking book software, it must be processed by a C program called "BOOKTAB". This program generates the three configuration tables (see below) which describe the relationship between the chapters, pages and phrases of the talking book.

On a DOS command line, 'booktab sinbad.txt>booktab.asm' reads the script file 'sinbad.txt' (see Appendix A) and generates the configuration tables (see Appendix B), writing them to the file 'booktab.asm'.

The MSP50C30 synthesizer 11 requires that speech data be arranged into segments. Another C program, SGM30, takes the script file and assigns each file to a certain segment.

On a DOS command line, 'sgm30 sinbad.txt>sinbad.asm' reads the script file 'sinbad.txt' and generates the segment tables (see Appendix C), writing them to the file 'sinbad.asm'.

These two files, 'booktab.asm' and 'sinbad.asm', must be merged with the main control software. Re-compiling this software generates the binary file for the talking book, which can be programmed into the memory card.

Three configuration tables—Phrase Table, Page Table and Chapter Table—are used to define the hierarchy of the talking book. Each book contains one or more chapters; each chapter contains one or more pages; and each page is made up of one or more phrases. A phrase can be a word, a sentence or short paragraph of speech, or a sound effect.

The Chapter Table defines the first phrase of each chapter. Similarly, the Page Table defines the first phrase of each page. In the examples below, chapter 2 begins with phrase 26. Page 3 begins with phrase 11.

```
*********************************************************
*Book Chapter Table
*********************************************************
BK_CHAPTAB
    byte 1
    byte 26          ;chapter 2
    byte 57
*********************************************************
*Book Page Table
*********************************************************
BK_PAGETAB
    byte 1
    byte 6
    byte 11          ;page 3
    byte 16
    byte 20
```

The Phrase Table is more complex since it contains four fields; chapter, page, general and speech mode. The Chapter field defines the chapter to which the Nth phrase belongs. Likewise, the Page field defines the page to which the Nth phrase belongs. In the example below, the 6th phrase belongs to Chapter 1, Page 2.

```
*********************************************************
*Book Phrase Table
*********************************************************
BK_PHRTAB
*Chapter 1
*Page 1
*Phrase 1
*8 kHz
*10 kHz
    byte 1,1,1,#80         ;speech\sinbad\flut10a.BYT
*8 kHz
    byte  1,1,2,#00        ;speech\sinbad\V1_01.BYT
    byte  1,1,3,#00        ;speech\sinbad\V1_02.BYT
    byte  1,1,4,#00        ;speech\sinbad\V1_03.BYT
    byte  1,1,5,#00        ;speech\sinbad\V1_04.BYT
    *Page 2
    byte 1,2,6,#00         ;speech\sinbad\V1_05.BYT   6th phrase
    byte 1,2,7,#00         ;speech\sinbad\V1_06.BYT
```

The general field can be used in several ways. Here, it simply repeats the phrase number. However, the general field could be used as a book number, or as an extension to the page number if more than 255 pages are required. Or, as a way of controlling the operation of the talking book. For example, the code could indicate which string to write to an LCD, or the pattern to display on a bank of LEDs. This level of configurability could be employed in a child's learning aid, when the user interface and user feedback may change depending on the child's response.

The speech mode field defines the sampling rate (8 or 10 kHz represented by #80 or #00) and also the type of synthesis algorithm (CELP, MELP or PCM) and the bit rate. MELP refers to Mixed Excitation Linear Prediction. This is good for speech, with bit rates around 2400 bps. CELP refers to Codebook Excited Linear Prediction. This is good for speech and most sound effects, with bit rates from 4200 to 10700 bps. PCM refers to Pulse Code Modulation. This is good for complex sound effects, with a bit rate of 64000 bps. Typically, an algorithm is chose on its ability to deliver the best quality speech at the lowest bit rate. Some voices, and most sound effects, demand a higher sampling rate and/or a higher bit rate in order to meet the quality requirements.

Here, the 7$^{th}$ bit of the speech mode field specifies the sampling rate. If the bit is set high (one) then the sampling rate is 10 kHz. If the bit is set low (zero) the sampling rate is 8 kHz. The remaining seven bits (bits 6–0) can be used to specify different algorithms (MELP, CELP and PCM) at different bit rates.

Three variables are used to keep track of the current position; ChapterNum, PageNum and PhraseNum. The talking book starts on Chapter 1, Page 1, Phrase 1 (see Appendix A below). If the user presses 'Next Page' then PageNum will be incremented from one to two. From the Page Table, the second entry is 6. Therefore, this is the new PhraseNum. From the Phrase Table, the 6$^{th}$ entry lists Chapter 1, Page 2, Phrase 6, at 8 kHz.

```
*Page 2
    byte 1,2,6,#00    ;speech\sinbad\V1_05.BYT        6th entry
```

If the user then presses 'Next Chapter' then ChapterNum will be incremented from one to two. From the Chapter Table, the second entry is 26. Therefore, the second chapter begins with phrase 26. From the Phrase Table, the 26$^{th}$ entry lists Chapter 2, Page 6, Phrase 26, at 10 kHz.

```
*Chapter 2
*Page 6
*10 kHz
    byte 2,6,26,#80   ;speech\sinbad\drum10c.BYT      26th entry
```

It is possible to move from one point to another by using the Phrase Table and one other table, either the Page Table or the Chapter Table. The procedure is to find the PhraseNum on the selected page or chapter, and then refer to the Phrase Table for further information, such as which speech algorithm to use and at what sampling rate.

What is claimed:

1. A talking book system comprising:

an audio system for producing sound;

a memory for storing data representing spoken phrases and/or sounds;

a sound synthesizer coupled to said audio system and said memory responsive to stored data for producing synthesized spoken phrases and/or sounds;

said memory have data addressable by book divisions; and switch means coupled to said memory for addressing said memory by book divisions; said data in said memory is generated by the steps of generating a script; providing phrase and sound data; providing a playback program; converting said script and said phrase and sound data to segment tables and configuration tables; assembling said configuration tables, segment tables and playback program to combined data; and storing the combined data.

2. A method of authoring a talking book with a memory comprising the steps of:

generating a script;

providing phrase and sound data;

providing a playback program;

converting said script and said phrase and sound data to segment tables and configuration tables;

assembling said configuration tables, segment tables and playback program to combined binary data and storing said combined binary data in said memory of said talking book.

3. The method of claim 2, wherein said configuration tables are for phrase, chapter and page.

4. A method of authoring a talking book with a memory comprising the steps of writing script comprising a text of speech files interspersed with a number of keywords or commands;

processing said script to generate configuration tables describing the relationship between chapters, pages and phrases of the talking book;

processing said script to generate data segment tables storing the speech and sound data and indicating the segment location of the speech or sound in the memory by phrase number;

assembling said configuration tables and said segment tables and said speech and sound data with a program control code and into machine code; and storing said machine code in the memory of said talking book.

5. A talking book system comprising:

a memory for storing data representing spoken words and/or sounds;

a sound synthesizer and audio system coupled to said memory responsive to said data for generating synthesized words and/or sounds; and said data in said memory generated by the steps of generating a script, providing word and sound data; providing a playback program; converting said script and phrase data to segment tables and configuration tables; assembling said configuration tables, segment tables, and playback program to combined data and storing the combined data.

* * * * *